(12) United States Patent
Spolnicki et al.

(10) Patent No.: US 12,073,211 B2
(45) Date of Patent: Aug. 27, 2024

(54) WIDGET DELIVERY WORKFLOW SYSTEM AND METHOD

(71) Applicant: SCHLUMBERGER TECHNOLOGY CORPORATION, Sugar Land, TX (US)

(72) Inventors: Brian Spolnicki, Katy, TX (US); Neeraj Kamat, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 108 days.

(21) Appl. No.: 17/755,010

(22) PCT Filed: Nov. 21, 2019

(86) PCT No.: PCT/US2019/062545
§ 371 (c)(1),
(2) Date: Apr. 19, 2022

(87) PCT Pub. No.: WO2021/101546
PCT Pub. Date: May 27, 2021

(65) Prior Publication Data
US 2022/0391201 A1    Dec. 8, 2022

(51) Int. Cl.
*G06F 8/71*      (2018.01)
*G06F 8/61*      (2018.01)

(52) U.S. Cl.
CPC . *G06F 8/71* (2013.01); *G06F 8/63* (2013.01)

(58) Field of Classification Search
CPC .................................. G06F 8/63; G06F 8/71
See application file for complete search history.

(56) References Cited

U.S. PATENT DOCUMENTS

| | | | | |
|---|---|---|---|---|
| 10,114,637 B1* | 10/2018 | Willson | ................... | G06F 8/71 |
| 10,534,595 B1* | 1/2020 | Lisuk | ................... | G06N 20/20 |
| 10,579,966 B1* | 3/2020 | Willson | ................... | G06F 8/20 |
| 10,732,962 B1* | 8/2020 | Florescu | ............ | G06F 11/0706 |
| 10,761,860 B2* | 9/2020 | Chaney | ................... | G06F 8/71 |

(Continued)

FOREIGN PATENT DOCUMENTS

WO      2015092519 A1    6/2015

OTHER PUBLICATIONS

Wolfinger et al., "A Component Plug-In Architecture for the .NET Platform", 2006, Springer-Verlag Berlin Heidelberg (Year: 2006).*

(Continued)

*Primary Examiner* — Qing Chen
*Assistant Examiner* — Junchun Wu
(74) *Attorney, Agent, or Firm* — Jeffrey D. Frantz

(57) ABSTRACT

A method may include receiving a version of software widget source code, storing the version of software widget source code, and determining that a version of application source code and a view of software widget source code are used in a deployment environment. The version of application source code may call the version of software widget source code. The method may further include determining that the version of software widget source code corresponds to the view of software widget source code, constructing a build including the version of application source code and the version of software widget source code, and deploying the build in the deployment environment.

15 Claims, 8 Drawing Sheets

(56) References Cited

U.S. PATENT DOCUMENTS

| | | | | |
|---|---|---|---|---|
| 10,824,442 B2* | 11/2020 | Ruder | | G06F 9/44505 |
| 10,853,780 B1* | 12/2020 | Sirota | | G06Q 10/06 |
| 10,877,869 B1* | 12/2020 | Nair | | G06Q 10/06 |
| 2009/0300617 A1* | 12/2009 | Onorato | | G06F 8/71 |
| | | | | 718/100 |
| 2011/0067003 A1 | 3/2011 | Slothouber et al. | | |
| 2011/0197175 A1* | 8/2011 | Bouz | | G06F 8/658 |
| | | | | 717/174 |
| 2011/0197197 A1 | 8/2011 | Ni et al. | | |
| 2014/0047409 A1 | 2/2014 | Yang et al. | | |
| 2014/0282400 A1* | 9/2014 | Moorthi | | G06F 9/45558 |
| | | | | 717/122 |
| 2014/0282453 A1* | 9/2014 | O'Rourke | | G06F 11/3624 |
| | | | | 717/154 |
| 2016/0092204 A1* | 3/2016 | Katkere | | G06F 8/71 |
| | | | | 717/170 |
| 2016/0147529 A1* | 5/2016 | Coleman | | G06F 8/71 |
| | | | | 717/120 |
| 2016/0188640 A1 | 6/2016 | Dani et al. | | |
| 2016/0212164 A1* | 7/2016 | Nguyen | | H04L 63/10 |
| 2018/0081702 A1* | 3/2018 | Cohen | | G06F 8/71 |
| 2019/0294528 A1* | 9/2019 | Avisror | | G06F 11/3688 |
| 2020/0117434 A1* | 4/2020 | Biskup | | G06F 9/445 |

OTHER PUBLICATIONS

Goldstein et al., "Automatic and Continuous Software Architecture Validation", 2015, IEEE (Year: 2015).*

García-Munoz et al., "Improved Metrics Handling in SonarQube for Software Quality Monitoring", 2016, Springer International Publishing Switzerland (Year: 2016).*

Plosch et al., "Tool Support for Expert-Centred Code Assessments", 2008, IEEE (Year: 2008).*

Leff et al., "Web-Application Development Using the Model/View/Controller Design Pattern", 2001, IEEE (Year: 2001).*

Search Report and Written Opinion of International Patent Application No. PCT/US2019/062545 on Aug. 20, 2020; 9 pages.

International Preliminary Report on Patentability of International Patent Application No. PCT/US2019/062545 dated Jun. 2, 2022.

* cited by examiner

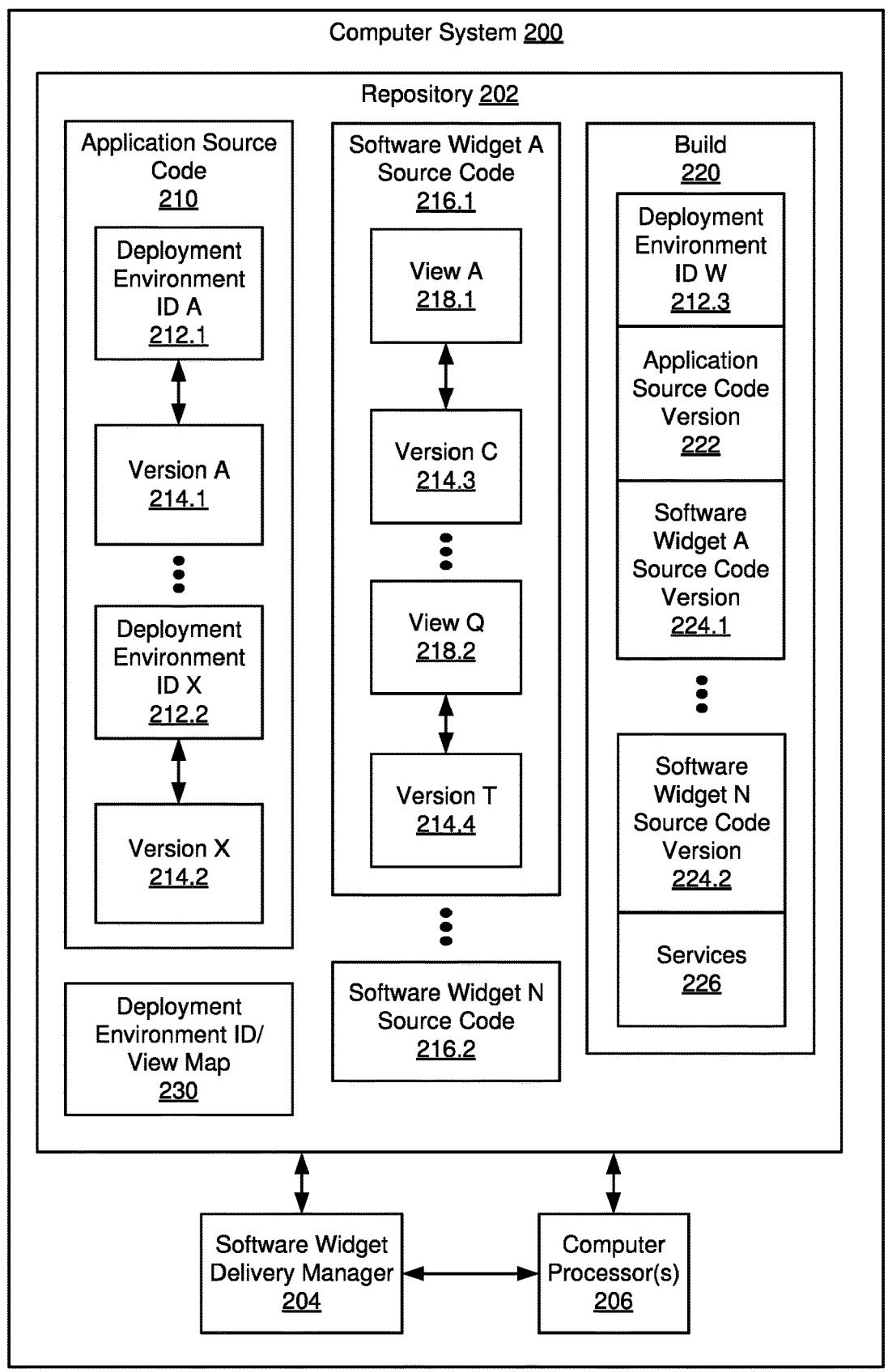
FIG. 2.1

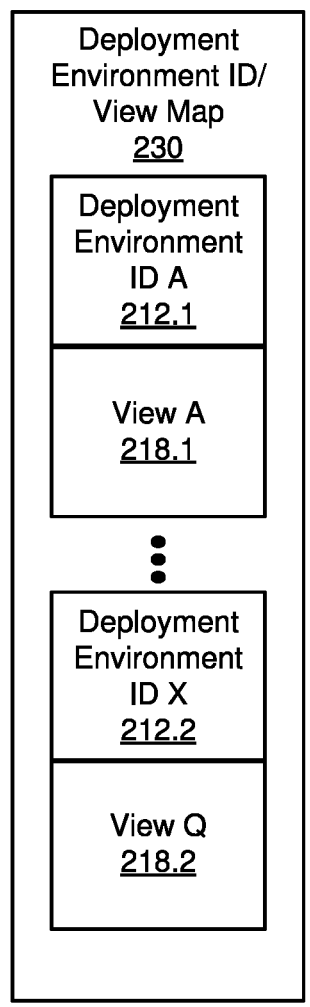
FIG. 2.2

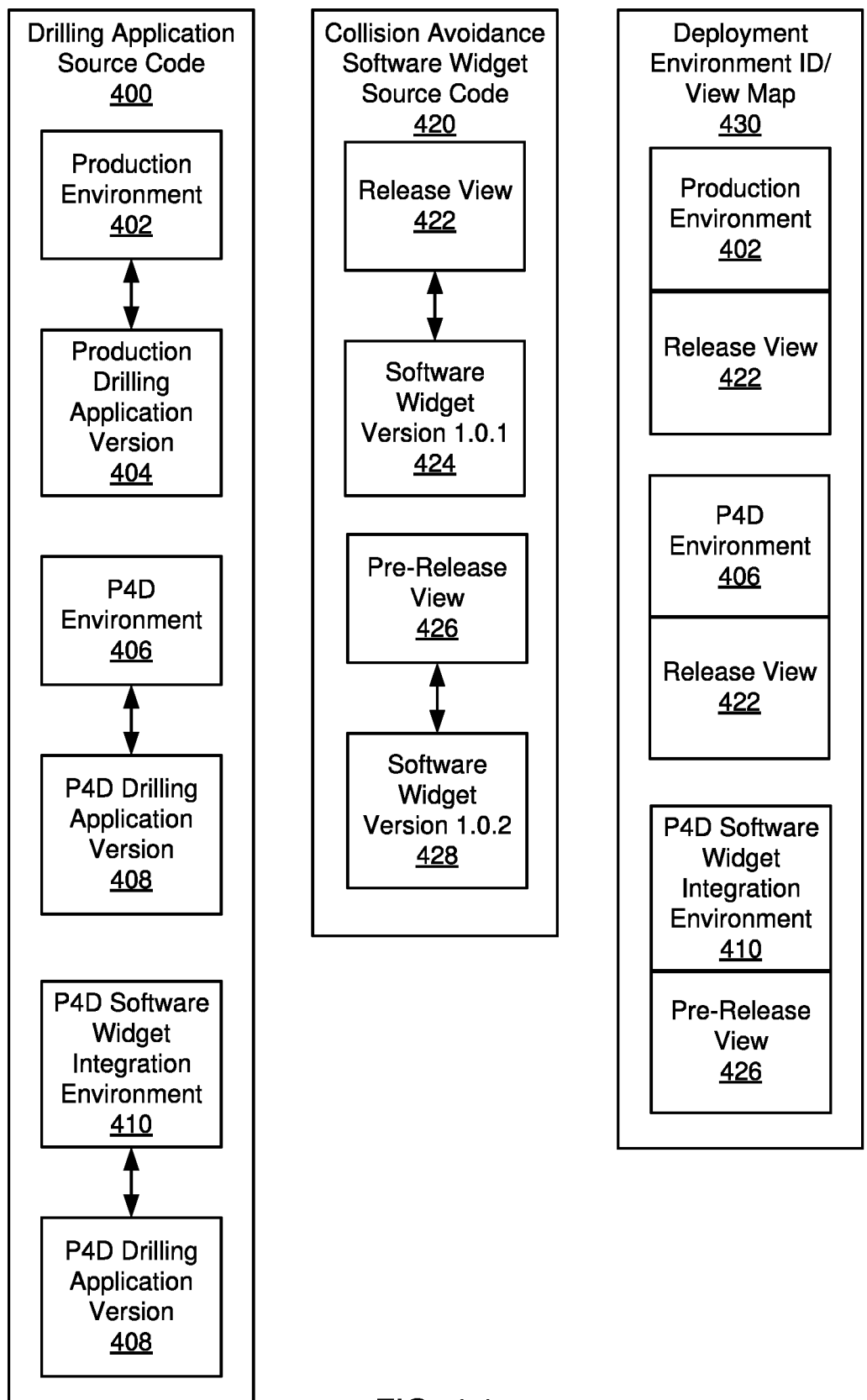
FIG. 4.1

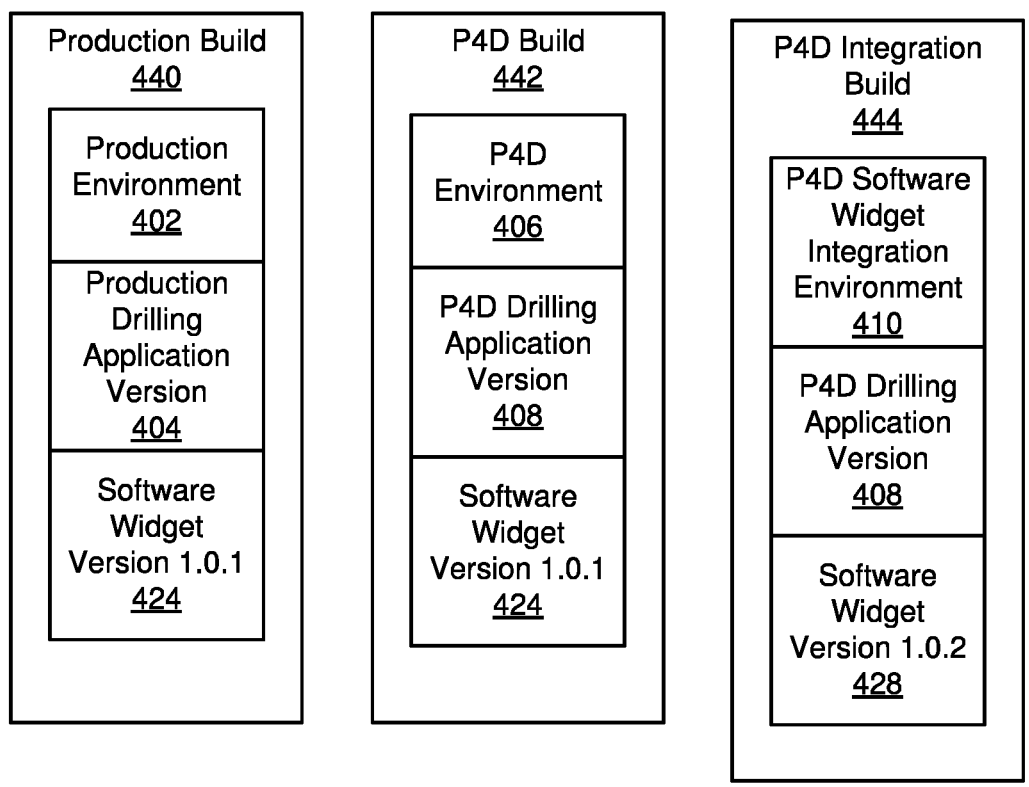
FIG. 4.2

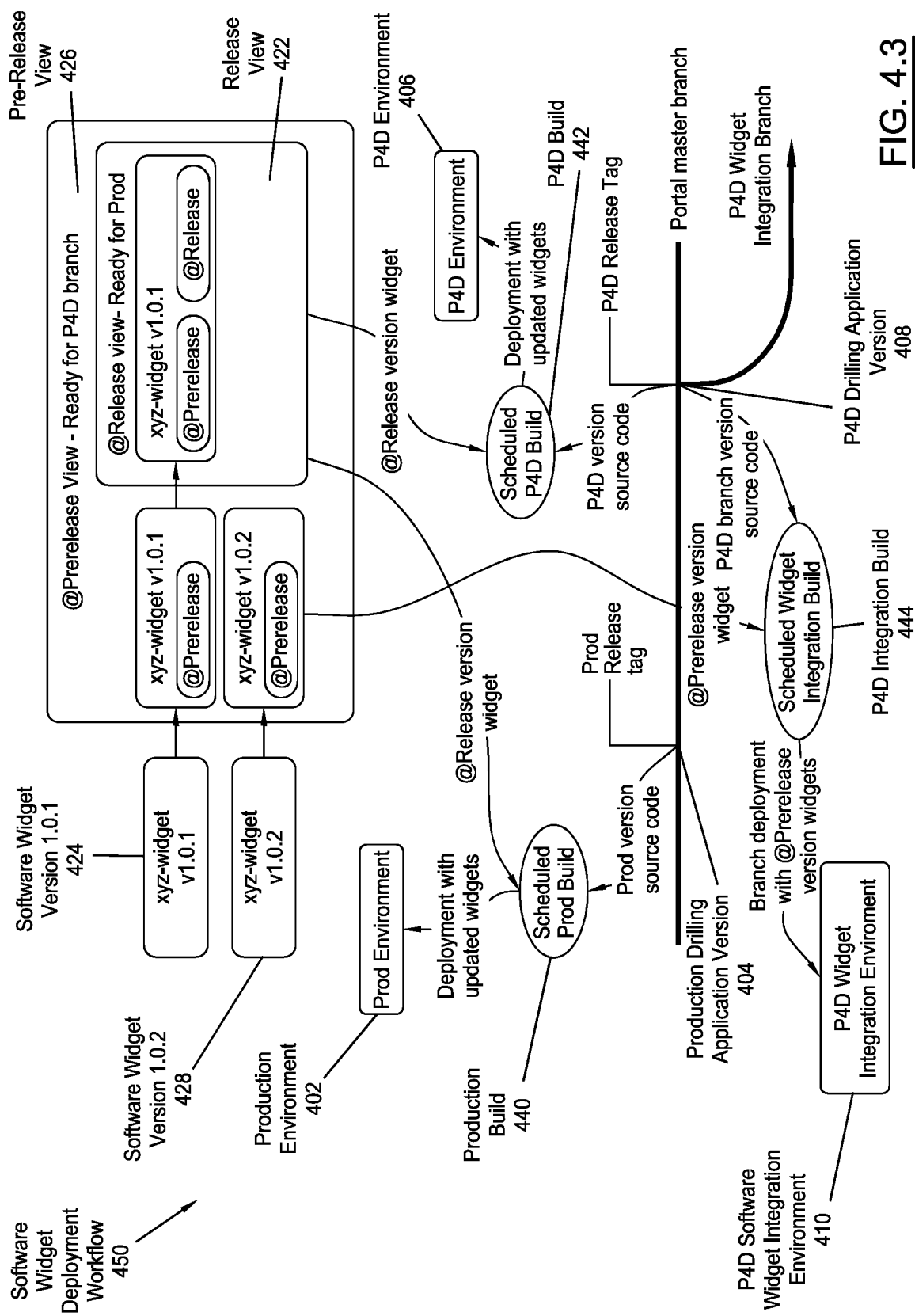
FIG. 4.3

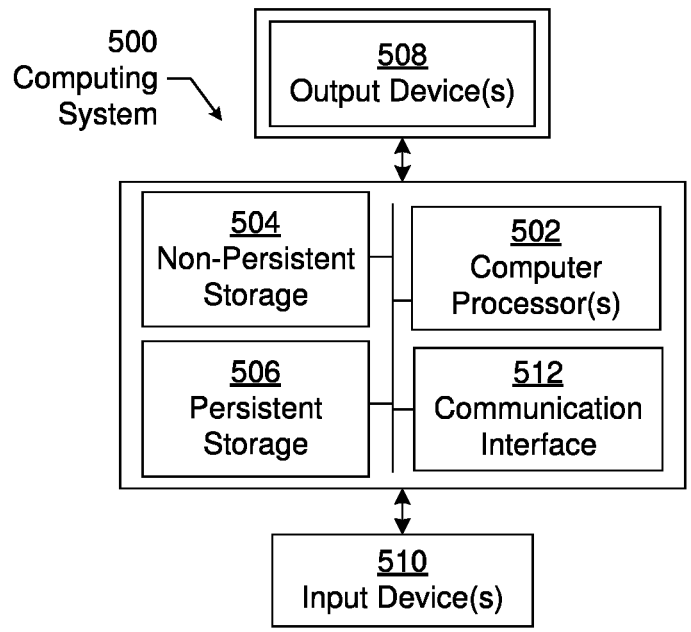
FIG. 5.1
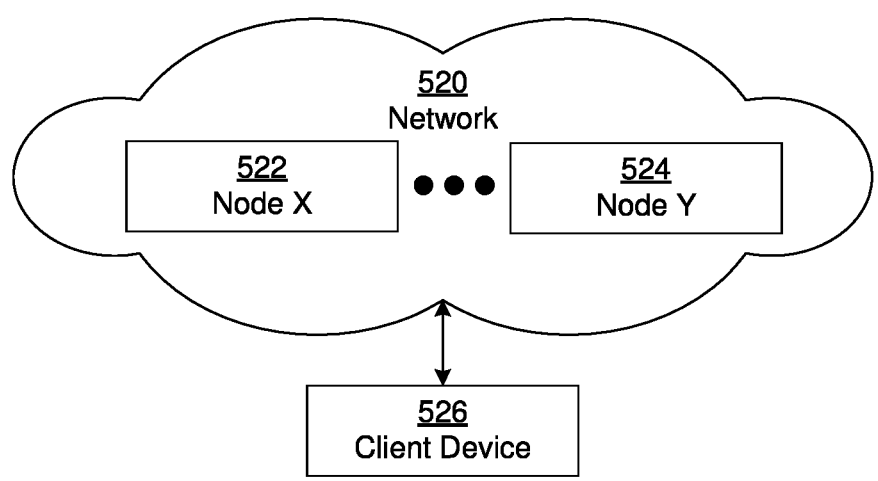
FIG. 5.2

WIDGET DELIVERY WORKFLOW SYSTEM AND METHOD

CROSS-REFERENCE TO RELATED APPLICATIONS

This application is a National Stage Entry of International Patent Application No. PCT/US2019/062545, filed on Apr. 19, 2022.

BACKGROUND

In today's marketplace, developers create applications or software widgets (e.g., plug-ins, skins, etc.) that are consumed by other applications. Integrating such software widgets into cloud-based deployment environments can be challenging and cumbersome due to a lack of a systematic integration process. For example, a cloud-based environment may provide services such as authentication, authorization, metering, billing, notification and task management which may need to operate seamlessly with the software widgets, in an integrated fashion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving, from versions of software widget source code, a version of software widget source code, storing the version of software widget source code, and determining that a version of application source code and a view of software widget source code are used in a deployment environment. The version of application source code calls the version of software widget source code. The method further includes determining that the version of software widget source code corresponds to the view of software widget source code, constructing, for the deployment environment, a build including the version of application source code and the version of software widget source code, and deploying the build in the deployment environment.

Other aspects of the disclosure will be apparent from the following description and the appended claims.

BRIEF DESCRIPTION OF DRAWINGS

FIGS. 2.1 and 2.2 show diagrams of a system in accordance with disclosed embodiments.

FIGS. 4.1, 4.2, and 4.3 show an example in accordance with disclosed embodiments.

FIGS. 5.1 and 5.2 show computing systems in accordance with disclosed embodiments.

DETAILED DESCRIPTION

Figure 1:
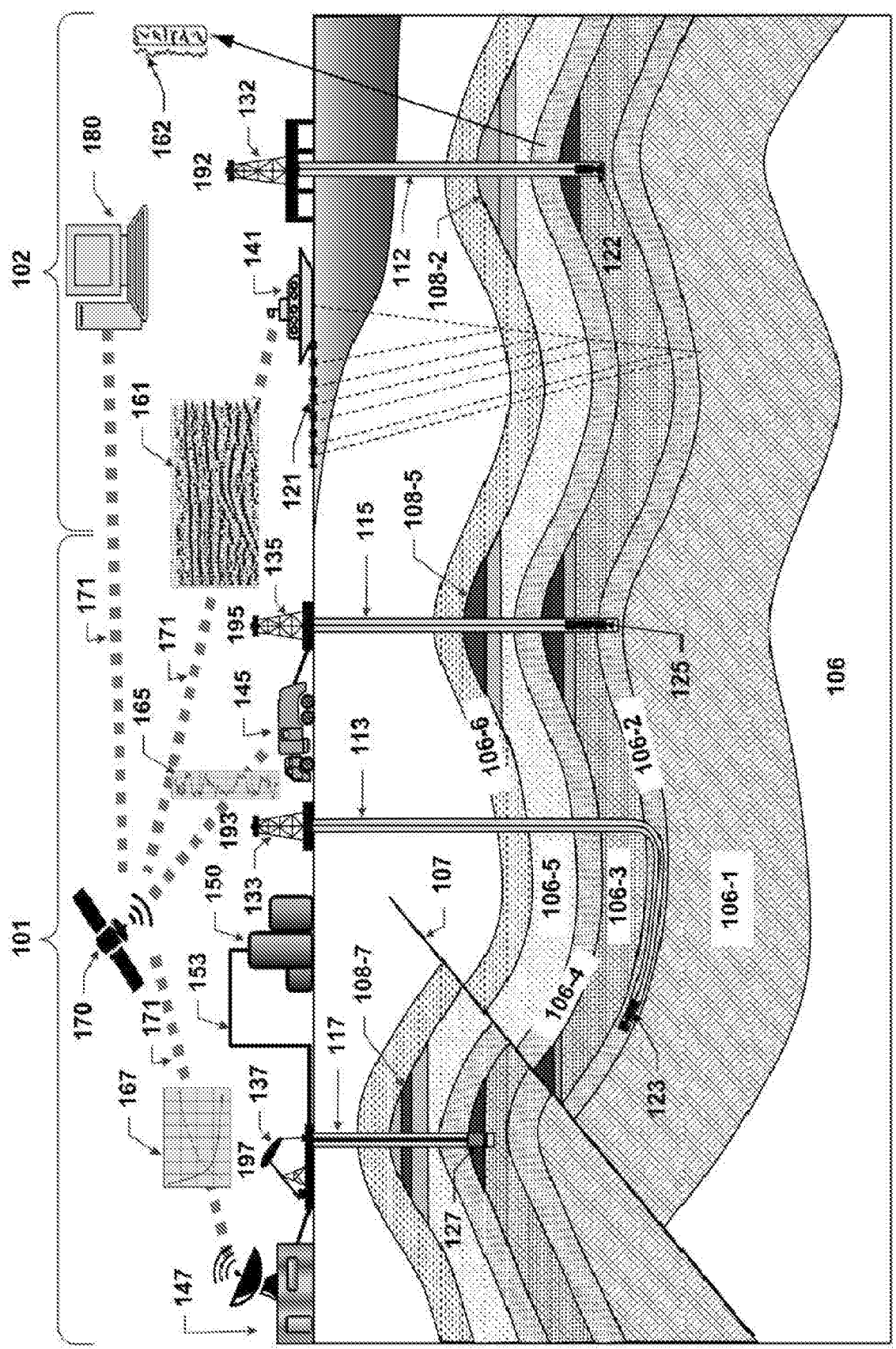
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to a software widget delivery workflow. In one or more embodiments, versions of software widget source code to be integrated with an application are received from a software widget delivery feed. The software widget delivery workflow may accommodate versions of software widget source code corresponding to a variety of software widgets, including software widgets developed by third parties. The versions of software widget source code may conform to a template that facilitates integration of the software widget with respect to a collection of services to be provided in a build. Examples of services include authentication, authorization, metering/rating/billing, notification and task management, libraries, framework components, and other functions that are useful in an cloud-based deployment environment.

A version of application source code and a view of software widget source code is determined for a deployment environment. The view indicates a level of quality associated with the software widget source code. For example, when the deployment environment is "production environment", the corresponding view is a "release view." A version of software widget source code corresponding to the view is determined. A build may be constructed and deployed for the deployment environment that includes the version of application source code and the version of software widget source code. Thus, at build time, the widgets corresponding to the deployment environment may be dynamically determined and added.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined.

In one or more embodiments, the E&P computer system (180) is implemented by an E&P services provider by deploying applications with a cloud based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 5.1 and 5.2 and described below.

FIG. 2.1 shows a computer system (200) in accordance with one or more embodiments of the disclosure. As shown in FIG. 2.1, the computer system (200) includes a repository (202), a software widget delivery manager (204), and computer processor(s) (206). The computer system (200) may correspond to the computing system (500) described with respect to FIG. 5.1 and the accompanying description below, or take the form of the client device (526) described with respect to FIG. 5.2. The computer processor(s) (206) takes the form of the computer processor(s) (502) described with respect to FIG. 5.1 and the accompanying description below. The computer processor (206) includes functionality to execute the software widget delivery manager (204).

In one or more embodiments of the disclosure, the repository (202) includes any type of storage unit and/or device (e.g., a file system, database, collection of tables, or any other storage mechanism) for storing data. Further, the repository (202) includes multiple different storage units and/or devices. The multiple different storage units and/or devices may or may not be of the same type or located at the same physical site.

In one or more embodiments, the repository (202) includes application source code (210), software widget source code (216.1, 216.2), a build (220), and a deployment identifier (ID)/view map (230). The application source code (210) and the software widget source code (216.1, 216.2) are collections of source code including various software components. The application source code (210) and the software widget source code (216.1, 216.2) may include statements written in a programming language, or intermediate representation (e.g., byte code). The application source code (210) and the software widget source code (216.1, 216.2) may be transformed by a compiler into binary machine code. Compiled machine code may be executed by the processor (206) in order to execute software components generated from the application source code (210) and the software widget source code (216.1, 216.2). The application source code (210) and the software widget source code (216.1, 216.2) are any collections of object code (e.g., machine code generated by a compiler) or another form of the application source code (210) and/or the software widget source code (216.1, 216.2).

In one or more embodiments, the application source code (210) includes one or more versions (214.1, 214.2). Each version corresponds to a deployment environment ID (212.1, 212.2). In one or more embodiments, the correspondence of the deployment environment ID (212.1) to the version (214.1) of the application source code (210) is implemented by a table that maps the deployment environment ID (212.1) to the corresponding version (214.1) of the application source code (210). For example, the table may identify the corresponding version (214.1) of the application source code (210) by a version ID and/or a location (e.g., a filename) in the computer system.

The deployment environment ID (212.1) matches a deployment environment. A deployment environment is a computing system (e.g., computing system (500)) in which one or more software components are deployed and executed. There are different deployment environments for different purposes. Examples of deployment environments may include: a production environment, a development environment, a unit testing environment, a system integration environment, a user acceptance environment, etc.

Each version (214.1, 214.2, 214.3, 214.4) corresponds to a version ID. Version IDs may be assigned in increasing order to successive versions. For example, a version ID of 1.0.0 may be assigned to an initial version, and successive versions may be assigned version IDs of 1.0.1, 1.0.2, . . . 1.1.0, 1.1.1, 1.1.2, . . . 2.0.0, 2.0.1, etc. The version ID contains information regarding the type of changes introduced relative to a previous version. As a specific example, when semantic versioning is used, the version ID is divided into a sequence of three digits indicating a major version ID, a minor version ID, and a patch ID. Continuing this example, an increase in the major version ID may indicate the introduction of a major (e.g., non-backward-compatible) change. In contrast, an increase in the minor version ID may indicate the introduction of a minor (e.g., backward-compatible) change. And an increase in the patch ID may indicate that one or problems are fixed.

The software widget source code (216.1, 216.2) includes one or more versions (214.3, 214.4) each corresponding to a view (218.1, 218.2). A view (218.1) is an indicator of the quality of the corresponding version (214.3) of the software widget source code (216.1). For example, the view (218.1) may be assigned after the corresponding version (214.3) of the software widget source code (216.1) passes one or more tests. Continuing this example, the tests may include unit testing of the software widget source code (216.1), integration testing of the software widget source code (216.1) with the application source code (210), or integration testing of the software widget source code (216.1) with the application source code (210) and other software widget source code (216.2). Different views exist for different purposes. For example, a pre-release view may indicate that the corresponding software widget source code (216.1) is undergoing unit testing or system integration testing. And a release view may indicate that the corresponding software widget source code (216.1) has passed system integration testing and is ready for wider use (e.g., for user acceptance testing or in live production).

In one or more embodiments, the correspondence of the view (218.1) to the version (214.3) of the software widget source code (216.1) is implemented by a table that maps the view (218.1) to the corresponding version (214.3) of the software widget source code (216.1). For example, the table may identify the corresponding version (214.3) of the software widget source code (216.1) by a version ID and/or a location in the computer system.

In one or more embodiments, the version (214.3) of software widget source code (216.1) is developed using a template. The template is a collection of one or more constraints to be satisfied by the version (214.3) of software widget source code (216.1). Satisfying the constraints of the template ensures that the software widget source code (216.1) may be integrated with a collection of services (e.g., services (226)) in a seamless manner. For example, the template may constrain the software widget source code (216.1) to access one or more services (226) in a build (220) using an access token. Continuing this example, the access token is created by an authorization service. In addition, the template may constrain the software widget source code (216.1) to access one or more services (226) in a build (220) using one or more specific application programming interfaces (APIs).

As shown in FIG. 2.2, the deployment ID/view map (230) maps each deployment ID (212.1, 212.2) to a view (218.1, 218.2). For example, the deployment ID "production" may be mapped to a "release" view, and the deployment ID "development" may be mapped to a "pre-release" view.

Returning to FIG. 2.1, the build (220) is executable code generated from an application source code version (222) and software widget source code versions (224.1, 224.2) for a deployment environment ID (212.3). For example, the build (220) is generated by compiling the application source code version (222) and the software widget source code versions (224.1, 224.2). The application source code version (222) corresponds to the deployment environment ID (212.3). Each software widget source code version (224.1, 224.2) corresponds to a view (e.g., 218.1, 218.2) that corresponds to the deployment environment ID (212.3). For example, the view corresponding to the deployment environment ID (212.3) is found in the deployment ID/view map (230). The build (220) is deployed in the deployment environment corresponding to the deployment environment ID (212.3).

In one or more embodiments, the build (220) includes services (226). The services (226) implement functionality that may be used by the application source code version (222) and software widget source code versions (224.1, 224.2). Examples of services (226) include: authentication, authorization, metering/rating/billing, notification and task management, libraries, framework components, and other functions that are useful in a cloud-based deployment environment. As a specific example, an authorization service provides access tokens to the application source code version (222) and/or software widget source code versions (224.1, 224.2).

In one or more embodiments, the software widget delivery manager (204) is implemented in hardware (e.g., circuitry), software, firmware, and/or any combination thereof. The software widget delivery manager (204) includes functionality to receive versions (214.3, 214.4) of software widget source code (216.1, 216.2). The software widget delivery manager (204) includes functionality to determine a version (214.1) of application source code (210) and a view (218.1) of software widget source code (216.1) for a deployment environment corresponding to a deployment environment ID (212.3). The software widget delivery manager (204) includes functionality to construct a build (220) for a deployment environment corresponding to a deployment environment ID (212.3).

While FIG. 2.1, and FIG. 2.2 show configurations of components, other configurations may be used without departing from the scope of the disclosure. For example, various components may be combined to create a single component. As another example, the functionality performed by a single component may be performed by two or more components.

Figure 3:
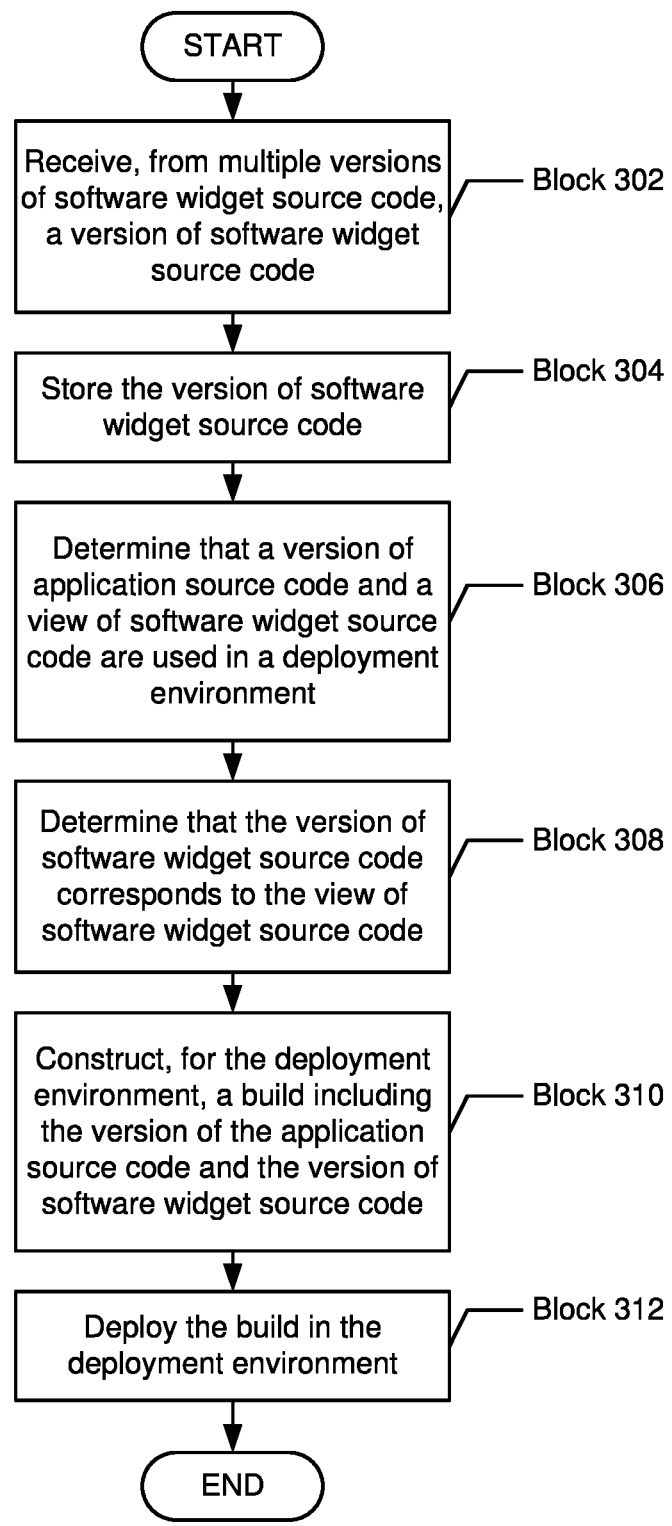
FIG. 3 shows a flowchart in accordance with disclosed embodiments.

FIG. 3 shows a flowchart in accordance with one or more embodiments of the disclosure. The flowchart depicts a process for software widget delivery. One or more of the blocks in FIG. 3 may be performed by the components (e.g., the software widget delivery manager (204)) of the computer system (200)) discussed above in reference to FIG. 2.1 and FIG. 2.2. In one or more embodiments, one or more of the blocks shown in FIG. 3 may be omitted, repeated, and/or performed in parallel, or in a different order than the order shown in FIG. 3. Accordingly, the scope of the disclosure should not be considered limited to the specific arrangement of blocks shown in FIG. 3.

Initially, in Block 302, a version of software widget source code is received. The version of software widget source code is one of multiple versions of software widget source code. For example, the multiple versions of software widget source code may be included in a software widget delivery feed.

The software widget source code provides functionality that is useful to the application source code. Thus, the version of the software widget source code may be designed to be called (e.g., consumed) by the application source code. In one or more embodiments, the software widget delivery manager validates the version of software widget source code. For example, the software widget delivery manager may validate that the version of software widget source code calls one or more services using an access token. Continuing this example, the software widget delivery manager may validate that the version of software widget source code receives the access token from a version of application source code when the version of application source code calls the version of software widget source code. In addition, the software widget delivery manager may validate that the version of software widget source code receives configuration information from the version of application source code.

In Block 304, the version of software widget source code is stored. The version of software widget source code may be stored in a repository. The repository may store the view corresponding to the version of software widget source code.

In Block 306, it is determined that a version of application source code and a view of software widget source code are used in a deployment environment. The software widget delivery manager uses the deployment ID of the deployment environment to determine the version of application source code corresponding to the deployment environment. For example, the software widget delivery manager may lookup the deployment ID of the deployment environment in a table that maps the deployment environment ID to the corresponding version of the application source code. In one or more embodiments, the software widget delivery manager determines the view corresponding to the deployment environment by looking up the deployment ID of the deployment environment in the deployment ID/view map.

In Block 308, it is determined that the version of software widget source code corresponds to the view of software widget source code. The software widget delivery manager uses the view to determine the version of software widget source code corresponding to the view. For example, the software widget delivery manager may lookup the view in a table that maps the view to the corresponding version of the software widget source code.

In one or more embodiments, the version of the software widget source code may be assigned another view. For example, the version of the software widget source code may initially correspond to a pre-release view. The correspondence of the pre-release view and the version of the software widget source code may be stored in the table that maps the view to the corresponding version of the software widget source code. After passing a quality check, the version of the software widget source code may be assigned a release view. For example, the new correspondence of the release view and the version of the software widget source code is then stored in the table that maps the view to the corresponding version of the software widget source code.

In Block 310, a build is constructed for the deployment environment. The build includes the version of application source code and the version of software widget source code.

In Block 312, the build is deployed in the deployment environment.

FIG. 4.1, FIG. 4.2, and FIG. 4.3 show an implementation example(s) in accordance with one or more embodiments. The implementation example(s) are for explanatory purposes only and not intended to limit the scope of the disclosure. One skilled in the art will appreciate that implementation of embodiments of the disclosure may take various forms and still be within the scope of the disclosure.

FIG. 4.1 shows drilling application source code (400) ((210) in FIG. 2.1), collision avoidance software widget source code (420) ((216.1, 216.2) in FIG. 2.1), and a deployment ID/view map (430) ((230) in FIG. 2.1 and FIG. 2.2). The collision avoidance software widget provides timely alerts to the drilling application regarding potential collisions during a drilling campaign. There are three deployment environments, each corresponding to a deployment environment ID (402, 406, 410) ((212.1, 212.2, 212.3) in FIG. 2.1 and FIG. 2.2). The production deployment environment corresponds to the deployment environment ID "production environment" (402), the P4D deployment environment corresponds to the deployment environment ID "P4D environment" (406), and the P4D software widget integration deployment environment corresponds to the deployment environment ID "P4D software widget integration environment" (410). P4D is an acronym for "preview for developers". The "P4D software widget integration environment" (410) is created to integrate new software widgets with applications and to test updates to existing software widgets.

FIG. 4.1 shows that the deployment environment ID "production environment" (402) corresponds to the production drilling application version (404) ((214.1, 214.2) in FIG. 2.1) of the drilling application source code (400), the deployment environment ID "P4D environment" (406) corresponds to the P4D drilling application version (408) drilling application source code (400), and the deployment environment ID "P4D software widget integration environment" (410) also corresponds to the P4D drilling application version (408) drilling application source code (400).

FIG. 4.1 also shows that the view "release view" (422) corresponds to the software widget version 1.0.1 (424) ((214.3, 214.4) in FIG. 2.1) of the collision avoidance software widget source code (420), and the "pre-release view" (426) corresponds to the software widget version 1.0.2 (428) of the collision avoidance software widget source code (420).

The deployment ID/view map (430) shows that the deployment environment ID "production environment" (402) corresponds to the view "release view" (422), the deployment environment ID "P4D environment" (406) also corresponds to the view "release view" (422), and the deployment environment ID "P4D software widget integration environment" (410) corresponds to the view "pre-release view" (426).

FIG. 4.2 shows builds (440, 442, 444) ((220) in FIG. 2.1) corresponding to each deployment environment ID (402, 406, 410). The production build (440) corresponds to the deployment environment ID "production environment" (402). The software widget delivery manager determines that the production build (440) uses the production drilling application version (404) of the drilling application source code (400) because, as shown in FIG. 4.1, the deployment environment ID "production environment" (402) corresponds to the production drilling application version (404) of the drilling application source code (400). Next, the software widget delivery manager determines that the production build (440) uses the view "release view" (422) of the collision avoidance software widget source code (420) because, as shown in FIG. 4.1, the deployment ID/view map (430) indicates that the deployment environment ID "production environment" (402) corresponds to view "release view" (422). Then, the software widget delivery manager determines that the production build (440) uses the software widget version 1.0.1 (424) of the collision avoidance software widget source code (420) because, as shown in FIG. 4.1, the view "release view" (422) corresponds to the software widget version 1.0.1 (424) of the collision avoidance software widget source code (420).

The P4D build (442) corresponds to the deployment environment ID "P4D environment" (406). The software widget delivery manager determines that the P4D build (442) uses the P4D drilling application version (408) of the drilling application source code (400) because, as shown in FIG. 4.1, the deployment environment ID "P4D environment" (406) corresponds to the P4D drilling application version (408) of the drilling application source code (400). Next, the software widget delivery manager determines that the P4D build (442) uses the view "release view" (422) of the collision avoidance software widget source code (420) because, as shown in FIG. 4.1, the deployment ID/view map (430) indicates that the deployment environment ID "P4D environment" (406) corresponds to view "release view" (422). Then, the software widget delivery manager determines that the P4D build (442) uses the software widget version 1.0.1 (424) of the collision avoidance software widget source code (420) because, as shown in FIG. 4.1, the view "release view" (422) corresponds to the software widget version 1.0.1 (424) of the collision avoidance software widget source code (420).

The P4D integration build (444) corresponds to the deployment environment ID "P4D software widget integration environment" (410). The software widget delivery manager determines that the P4D integration build (444) uses the P4D drilling application version (408) of the drilling application source code (400) because, as shown in FIG. 4.1, the deployment environment ID "P4D software widget integration environment" (410) corresponds to the P4D drilling application version (408) of the drilling application source code (400). Next, the software widget delivery manager determines that the P4D integration build (444) uses the view "pre-release view" (426) of the collision avoidance software widget source code (420) because, as shown in FIG. 4.1, the deployment ID/view map (430) indicates that the deployment environment ID "P4D software widget integration environment" (410) corresponds to view "pre-release view" (426). Then, the software widget delivery manager determines that the P4D integration build (444) uses the software widget version 1.0.2 (428) of the collision avoidance software widget source code (420) because, as shown in FIG. 4.1, the view "pre-release view" (426) corresponds to the software widget version 1.0.2 (428) of the collision avoidance software widget source code (420).

FIG. 4.3 is a pictorial representation of a software widget delivery workflow (450) that shows the builds (440, 442, 444), deployment environment IDs (402, 406, 410), application source code versions (404, 408), software widget source code versions (424, 428), and views (422, 426) described in FIG. 4.1 and FIG. 4.2. Time flows from left to right in FIG. 4.3. That is, initially, the production build (440) is constructed, followed by the P4D build (442) and P4D integration build (444). In this example, the P4D build (442) and P4D integration build (444) are built concurrently, in order to pursue the P4D and P4D system integration testing processes concurrently. The software widget version 1.0.1 (424) had previously corresponded to the pre-release view (426), but was subsequently assigned to the release view (422). The software widget version 1.0.1 (424) was then superseded in the pre-release view (426) by the software widget version 1.0.2 (428).

Embodiments of the disclosure may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (520) (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (500) in FIG. 5.1 may be connected to or be a part of a network. For example, as shown in FIG. 5.2, the network (520) may include multiple nodes (e.g., node X (522), node Y (524)). Each node may correspond to a computing system, such as the computing system shown in FIG. 5.1, or a group of nodes combined may correspond to the computing system shown in FIG. 5.1. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform all or a portion of one or more embodiments of the disclosure.

The computing system or group of computing systems described in FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object.

The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (including layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 5.1 and the nodes and/or client device in FIG. 5.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method, comprising:
receiving, from a plurality of versions of software widget source code, a first version of software widget source code;
storing the first version of software widget source code into a storage unit of a computer system;
executing, via a processor of the computer system configured to implement a software widget delivery manager, a validation that a first version of application source code and a first view of software widget source code are used in a first deployment environment, wherein the first version of application source code calls the first version of software widget source code, wherein the first view of software widget source code comprises an indicator of quality of the first version of software widget source code assigned subsequent to at least one test of the first version of software widget source code;
executing a validation that the first version of software widget source code corresponds to the first view of software widget source code;
constructing, for the first deployment environment, a first build comprising the first version of application source code and the first version of software widget source code; and
deploying the first build in the first deployment environment to implement authentication, authorization, metering/rating/billing, notification, task management, libraries, framework components, or another function in the first deployment environment.

2. The method of claim 1, further comprising:
assigning a second view of software widget source code to the first version of software widget source code;
determining that the first version of application source code and the second view of software widget source code are used in a second deployment environment;
constructing, for the second deployment environment, a second build comprising the first version of application source code and the first version of software widget source code; and
deploying the second build in the second deployment environment.

3. The method of claim 2,
wherein the first deployment environment is a development environment,
wherein the second deployment environment is a production environment,
wherein the first build further comprises a service to implement the authentication, authorization, metering/rating/billing, notification, task management, libraries, framework components, or the another function in the first deployment environment, and
wherein the first version of software widget source code calls the service.

4. The method of claim 3, further comprising:
validating that the first version of software widget source code calls the service using an access token;
validating that the first version of software widget source code receives the access token from the first version of application source code; and
validating that the first version of software widget source code receives configuration information from the first version of application source code.

5. The method of claim 1, further comprising:
receiving, from the plurality of versions of software widget source code, a second version of software widget source code;
storing the second version of software widget source code;
determining that a second version of application source code and a second view of software widget source code are used in a second deployment environment, wherein the second version of application source code calls the second version of software widget source code;
determining that the second version of software widget source code corresponds to the second view of software widget source code;
constructing, for the second deployment environment, a second build comprising the second version of application source code and the second version of software widget source code; and
deploying the second build in the second deployment environment.

6. A system, comprising:
a memory coupled to a computer processor;
a repository configured to store a first version of application source code, a first version of software widget source code, and a first build comprising the first version of application source code and the first version of software widget source code, wherein the first version of application source code calls the first version of software widget source code; and
a software widget delivery manager, executed on the computer processor as configured to implement the software widget delivery manager and using the memory, configured to:
receive, from a plurality of versions of software widget source code, the first version of software widget source code;
store the first version of software widget source code;
execute a validation that the first version of application source code and a first view of software widget source code are used in a first deployment environment, wherein the first view of software widget source code comprises an indicator of quality of the first version of software widget source code assigned subsequent to at least one test of the first version of software widget source code;
execute a validation that the first version of software widget source code corresponds to the first view of software widget source code; and
construct, for the first deployment environment, the first build, and deploy the first build in the first deployment environment to implement authentication, authorization, metering/rating/billing, notification, task management, libraries, framework components, or another function in the first deployment environment.

7. The system of claim 6, wherein the software widget delivery manager is further configured to:
assign a second view of software widget source code to the first version of software widget source code,
determine that the first version of application source code and the second view of software widget source code are used in a second deployment environment,
construct, for the second deployment environment, a second build comprising the first version of application source code and the first version of software widget source code, and
deploy the second build in the second deployment environment.

8. The system of claim 7,
wherein the first deployment environment is a development environment,
wherein the second deployment environment is a production environment,
wherein the first build further comprises a service to implement the authentication, authorization, metering/rating/billing, notification, task management, libraries, framework components, or the another function in the first deployment environment, and
wherein the first version of software widget source code calls the service.

9. The system of claim 8, wherein the software widget delivery manager is further configured to:
validate that the first version of software widget source code calls the service using an access token;
validate that the first version of software widget source code receives the access token from the first version of application source code; and
validate that the first version of software widget source code receives configuration information from the first version of application source code.

10. The system of claim 6, wherein the software widget delivery manager is further configured to:
receive, from the plurality of versions of software widget source code, a second version of software widget source code;
store the second version of software widget source code;
determine that a second version of application source code and a second view of software widget source code are used in a second deployment environment,
determine that the second version of software widget source code corresponds to the second view of software widget source code,
construct, for the second deployment environment, a second build comprising the second version of application source code and the second version of software widget source code, and deploy the second build in the second deployment environment.

11. A non-transitory computer readable medium comprising instructions that, when executed by a computer processor, perform:
receiving, from a plurality of versions of software widget source code, a first version of software widget source code;
storing the first version of software widget source code;
executing, via the computer processor configured to implement a software widget delivery manager, a validation that a first version of application source code and a first view of software widget source code are used in a first deployment environment, wherein the first version of application source code calls the first version of software widget source code, wherein the first view of software widget source code comprises an indicator of quality of the first version of software widget source code assigned subsequent to at least one test of the first version of software widget source code;

executing a validation that the first version of software widget source code corresponds to the first view of software widget source code;

constructing, for the first deployment environment, a first build comprising the first version of application source code and the first version of software widget source code; and deploying the first build in the first deployment environment to implement authentication, authorization, metering/rating/billing, notification, task management, libraries, framework components, or another function in the first deployment environment.

12. The non-transitory computer readable medium of claim 11, wherein the instructions further perform:

assigning a second view of software widget source code to the first version of software widget source code;

determining that the first version of application source code and the second view of software widget source code are used in a second deployment environment;

constructing, for the second deployment environment, a second build comprising the first version of application source code and the first version of software widget source code; and deploying the second build in the second deployment environment.

13. The non-transitory computer readable medium of claim 12, wherein the first deployment environment is a development environment, and wherein the second deployment environment is a production environment, wherein the first build further comprises a service to implement the authentication, authorization, metering/rating/billing, notification, task management, libraries, framework components, or the another function in the first deployment environment, and wherein the first version of software widget source code calls the service.

14. The non-transitory computer readable medium of claim 13, wherein the instructions further perform:

validating that the first version of software widget source code calls the service using an access token; and validating that the first version of software widget source code receives the access token from the first version of application source code; and validating that the first version of software widget source code receives configuration information from the first version of application source code.

15. The non-transitory computer readable medium of claim 11, wherein the instructions further perform:

receiving, from the plurality of versions of software widget source code, a second version of software widget source code;

storing the second version of software widget source code;

determining that a second version of application source code and a second view of software widget source code are used in a second deployment environment, wherein the second version of application source code calls the second version of software widget source code;

determining that the second version of software widget source code corresponds to the second view of software widget source code;

constructing, for the second deployment environment, a second build comprising the second version of application source code and the second version of software widget source code; and deploying the second build in the second deployment environment.

* * * * *